June 24, 1930.    S. C. AWBREY    1,767,782
STAIR NOSING
Filed July 5, 1928

INVENTOR,
Samuel C. Awbrey.
BY Roy E. Hamilton
ATTORNEY

Patented June 24, 1930

1,767,782

UNITED STATES PATENT OFFICE

SAMUEL C. AWBREY, OF KANSAS CITY, MISSOURI, ASSIGNOR TO ETHEL AWBREY, OF KANSAS CITY, MISSOURI

STAIR NOSING

Application filed July 5, 1928. Serial No. 290,327.

This invention relates to stair tread nosings, and is especially adapted for use on stair treads having square corners and which are provided with some suitable covering, such as linoleum, etc.

The main object of this invention is to provide a nosing in which the lower edge of the facing flange will snugly fit against the outer edge of the stair tread, regardless of the shape of the tread.

A further object of the present invention is the provision of means for retaining the tread covering against outward or vertical movement.

A still further object is the contemplation of a tread nosing which is provided with a securing flange having a series of longitudinal bearing ribs on its lower side.

With these general objects in view, as well as minor objects, which will appear during the course of the detailed specification, the invention will now be described with reference to the accompanying drawing, wherein Figure 1, is a perspective view of a stair tread nosing embodying this invention.

Figure 1:
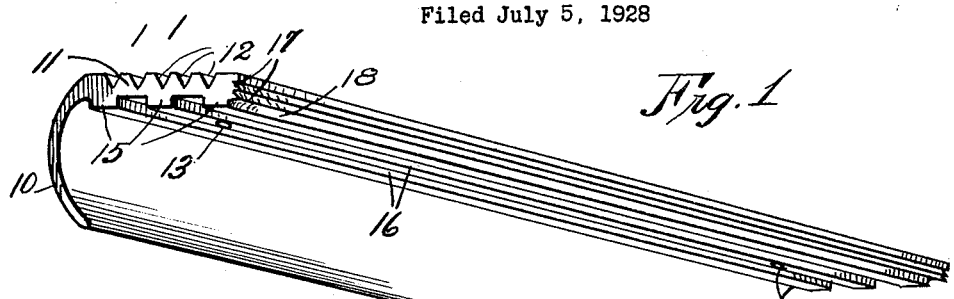
Figure 2:
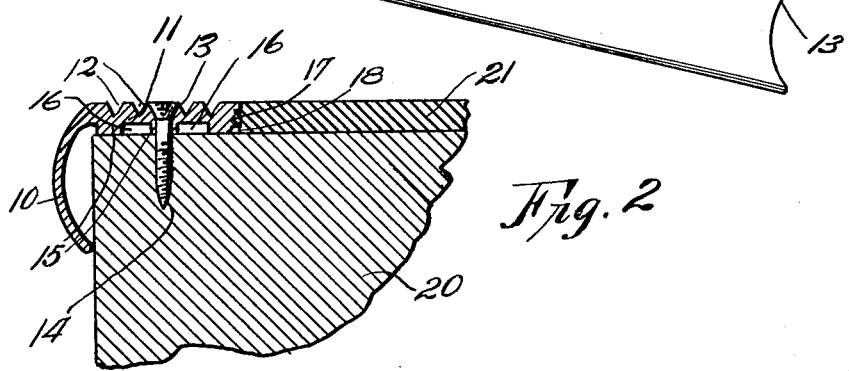
Fig. 2, is a cross-section of the same shown positioned on a stair tread.

Similar reference characters designate like parts throughout the several views, and the numeral 10 designates a vertical nosing flange which is preferably arcuate in form, and is integral with a securing flange 11 extending substantially perpendicular thereto, which is adapted to rest in a horizontal position on the front edge of the stair tread 20. The upper surface of the securing flange 11 is provided with any suitable roughened tread 12, to prevent accidental slipping. Also, the securing flange is provided with a series of spaced apart counter-sunk holes 13 adapted to receive screws 14, by means of which the nosing is securely held in position on the stair tread. The under side of the securing flange 12 has a plurality of longitudinal ribs 15, which are adapted to rest on the upper surface of the stair tread. With this type of lower surface of the securing flange, a more perfect union may be made, due to the fact that some of the irregularities of the surface of the tread will be received in the spaces 16, between the ribs 15. The inner edge of the securing flange 11 is provided with a series of longitudinal downwardly inclined ratchet teeth 17, which extend the full length of said flange, and serve to engage the tread covering 21 against upward movement. The inclined surfaces of the ratchet teeth 17 extend downwardly and rearwardly, while the under side of said ribs is substantially parallel with the under side of said securing flange. The tread covering, which is usually made of linoleum, or similar material, can be pressed downwardly past the ratchet teeth 17, and will be retained in this position, due to the fact that the ratchet teeth will bite into the edge of said material should it be moved in the upward direction. The lower inner edge of securing flange 11 is provided with a groove 18, which forms a recess for the reception of the frayed edges of the tread covering when in the operative position.

Figure 3:
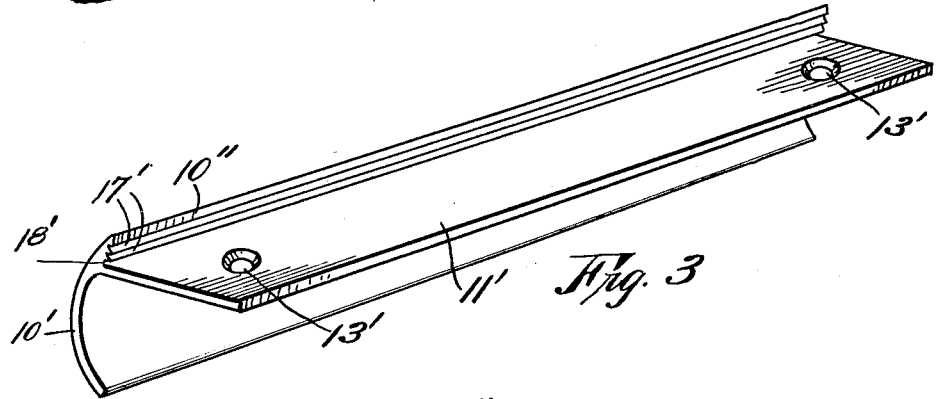
Fig. 3, is a modified form of a stair tread embodying this invention.
Figure 4:
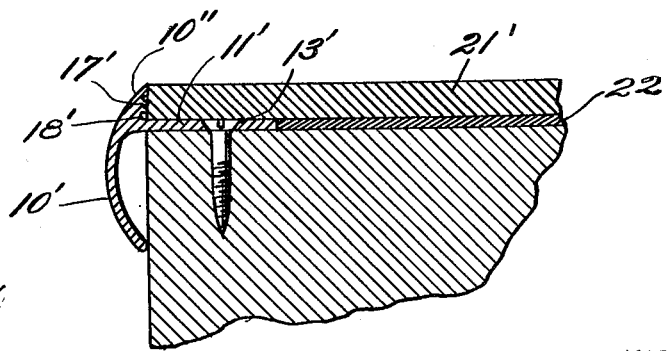
Fig. 4, is a cross-section of the modified form, shown in position on a stair tread.

The modified form, as shown in Figs. 3 and 4, provides for an upwardly extending portion 10″ of the vertical nosing flange 10′. This flange is made of a height equal to the thickness of the floor covering, and is provided with an inner face which corresponds to that of the inner edge of the securing flange 11, shown in the preferred form. The longitudinal, ratchet teeth 17′ serve to retain the covering against upward movement, while the groove 18′ in the rear face of 10″ is adapted to receive the frayed edges of the covering. Also, the securing flange 11′ is a plain flange of uniform thickness having a series of counter-sunk holes 13′ for securing the nosing to the stair tread. As shown in Fig. 4, the tread covering 21′ rests on top of the securing flange 11′, and its outer edge engages the inner edge of the flange 10″. To maintain a level surface for the reception of the floor covering, a filler 22 is placed on the tread inside of flange 11′.

One of the principal objects of this invention, which is shown in all the views, is a clearance between the nosing flange and a perpendicular plane from the lower inner edge of the nosing flange to the under side of the securing flange, thus making it possible to fit the nosing flange tightly against the front edge of the tread when the front, upper corner of the tread is a right angle. This construction provides a sanitary and sturdy nosing when in position on the tread, due to the fact that the lower edge of the flange 10 rests tightly against the tread, thus preventing the accumulation of dirt as is the case when the flange does not meet the tread, and also prevents any backward movement of the flange.

While I have illustrated and described what is now deemed to constitute the preferred form of embodyment of the invention, I desire to reserve the right to make all such formal changes or modifications as may fairly fall within the scope of the appended claims.

Having described the invention, what I claim is:

1. As a new article of manufacture, a stair nosing, comprising a vertically extending nosing flange having a rearwardly extending securing flange integral therewith, and a series of longitudinal, downwardly extending ratchet teeth on the inner surface of said stair nosing adapted to engage the outer edge of a tread covering when in operative position, said ratchet teeth being in substantially perpendicular alinement with the surface of said securing flange.

2. As a new article of manufacture, a stair nosing, comprising a vertically extending nosing flange having a rearwardly extending securing flange integral therewith, a series of longitudinal, downwardly extending ratchet teeth on the inner surface of said stair nosing adapted to engage the outer edge of a tread covering when in the operative position, said ratchet teeth being in substantially perpendicular alinement with the surface of said securing flange and a longitudinal recess in the inner face of said stair nosing and below said ratchet teeth adapted to receive the frayed edges at the lower outer edge of a tread covering when in the operative position.

3. As a new article of manufacture, a stair nosing, comprising a vertically extending convex nosing flange having a rearwardly extending securing flange integral therewith, said nosing flange extending entirely without a plane perpendicular from the lower inner edge of the nosing flange to the under side of said securing flange, a series of longitudinal ribs on the under side of said securing flange, and a series of downwardly extending longitudinal ratchet teeth in the inner edge of said securing flange adapted to engage a stair tread covering.

4. As a new article of manufacture, a stair nosing, comprising a vertically extending convex nosing flange having a rearwardly extending securing flange integral therewith, said nosing flange extending entirely without a plane perpendicular from the lower inner edge of the nosing flange to the under side of said securing flange, a series of longitudinal ribs on the under side of said securing flange, a longitudinal recess in the lower inner edge of said securing flange, and a series of downwardly extending longitudinal ratchet teeth in the inner edge of said securing flange adapted to engage a stair tread covering when in the operative position.

In testimony whereof, I hereunto affix my signature.

SAMUEL C. AWBREY.